United States Patent
Nanbu et al.

(10) Patent No.: US 11,219,279 B2
(45) Date of Patent: Jan. 11, 2022

(54) BUCKLE WITH STRING ADJUSTMENT PORTION

(71) Applicant: YKK CORPORATION, Tokyo (JP)

(72) Inventors: Madoka Nanbu, Kurobe (JP); Naoyuki Ito, Kurobe (JP); Eric Chew, Kurobe (JP)

(73) Assignee: YKK Corporation

( * ) Notice: Subject to any disclaimer, the term of this patent is extended or adjusted under 35 U.S.C. 154(b) by 0 days.

(21) Appl. No.: 16/991,550

(22) Filed: Aug. 12, 2020

(65) Prior Publication Data

US 2021/0052042 A1    Feb. 25, 2021

(30) Foreign Application Priority Data

Aug. 20, 2019  (CN) .......................... 201910770566.5

(51) Int. Cl.
  *A44B 11/10*  (2006.01)
  *A44B 11/00*  (2006.01)
  *A44B 11/26*  (2006.01)
(52) U.S. Cl.
  CPC ............ *A44B 11/10* (2013.01); *A44B 11/006* (2013.01); *A44B 11/266* (2013.01)
(58) Field of Classification Search
  CPC ....... A44B 11/266; A44B 11/25; A44B 11/10; A44B 11/006; Y10T 24/45524; Y10T 24/45529; Y10T 24/45534
  See application file for complete search history.

(56) References Cited

U.S. PATENT DOCUMENTS

| 4,577,377 | A | * | 3/1986 | Kasai | ................... | A44B 11/266 |
|  |  |  |  |  |  | 24/625 |
| 4,631,787 | A | * | 12/1986 | Kasai | ................... | A44B 11/266 |
|  |  |  |  |  |  | 24/616 |
| 4,662,040 | A | * | 5/1987 | Terrell | ................. | A44B 11/266 |
|  |  |  |  |  |  | 24/615 |
| 4,712,280 | A | * | 12/1987 | Fildan | .................... | A44B 11/08 |
|  |  |  |  |  |  | 24/171 |

FOREIGN PATENT DOCUMENTS

JP    2013248003    12/2013

OTHER PUBLICATIONS

Machine English translation of JP201348003A, retrieved from Espacenet Patent Search on Jun. 15, 2021. (Year: 2021).*

* cited by examiner

*Primary Examiner* — Robert Sandy
(74) *Attorney, Agent, or Firm* — Taylor English Duma LLP

(57) ABSTRACT

A buckle with a string adjustment portion includes a plug and a socket. The plug includes: a tightening string member attachment portion configured to slidably lock a string member and adjust a length of the string member; and leg portions which are inserted into and engaged with the socket. The socket includes a fitting portion including an insertion opening. An insertion hole through which the string member is inserted is formed to penetrate the tightening string member attachment portion, and a portion connecting the leg portions side of the insertion hole serves as a second bar. The second bar is located on an insertion direction side of the leg portions with respect to a position where an end portion of the plug and the insertion opening of the socket are abutted against each other, in a state where the leg portions are engaged with the socket.

2 Claims, 6 Drawing Sheets

BUCKLE WITH STRING ADJUSTMENT PORTION

CROSS-REFERENCE TO RELATED APPLICATIONS

This application is based on Chinese Patent Application No. 201910770566.5 filed on Aug. 20, 2019, the contents of which are incorporated herein by way of reference.

BACKGROUND

The present invention relates to a buckle with a string adjustment portion which can be slidably attached to any position of a string member and can adjust the string member to any length.

In related art, there is a buckle with a string adjustment portion that slidably locks a string member to adjust the string member to any length. Such a buckle is constituted by a plug to which the string member is attached in a manner that allows the length of the string member to be adjusted, and a socket where the plug is detachably engaged.

For example, an adjusting tool disclosed in Patent Literature 1 includes: a frame which includes a shaft hole; a first cross bar around which a set of string-shaped bodies are wound, the first cross bar being supported so as to be capable of reciprocating in the shaft hole; and a second cross bar to which a belt-shaped body is fixed. The adjusting tool may also be a buckle formed of a plug and a socket. The shaft hole and the first cross bar are provided on the plug, while a belt-shaped body cross bar is provided on the socket as the second cross bar.

[Patent Literature 1] JP-A-2013-248003

In the case of the above related art, the shaft hole is required to be elongated in a direction orthogonal to a longitudinal direction of the first cross bar so as to secure a movable range of the first cross bar. Moreover, in a state where the plug and the socket are engaged with each other, the shaft hole and the first cross bar are required to be located on an outer side of an end edge portion of the socket, and thus a shape of the plug protrudes from the socket in an elongated manner, so that an appearance thereof is not good. Further, when the shaft hole is downsized to shorten an entire length, operability when the string-shaped body is wound around the first cross bar, may be deteriorated. Moreover, the plug includes a pair of leg portions to be engaged with the socket, and spaces are formed between the pair of leg portions and between a pair of shaft hole portions that pivotally support the first cross bar. Thin connecting bars which connect base end portions of the leg portions are provided between the pair of leg portions and between the pair of shaft holes that pivotally support the first cross bar, and thus a risk of damage is high since the connecting bars are located on an outer side of the socket.

SUMMARY

The present invention has been made in view of the above-described problems in the related art, and an object thereof is to provide a buckle with a string adjustment portion which has a small size, a simple appearance, good operability and damage prevention, and can reliably lock a string member.

According to one advantageous aspect of the present invention, there is provided a buckle with a string adjustment portion, including: a plug and a socket which are capable of being connected to and disconnected from each other and which are respectively attached to a predetermined string member and a fixing member. The plug includes: a tightening string member attachment portion configured to slidably lock the string member and adjust a length of the string member; and leg portions which are inserted into and engaged with the socket. The socket includes: a fixing member attachment portion to which the fixing member is attached; and a fitting portion configured to accommodate and engage with the leg portions of the plug, the fitting portion including an insertion opening which is located on a side opposite to the fixing member attachment portion and into which the leg portions are inserted. The insertion opening is opened at an accommodating space in which the leg portions are accommodated. An insertion hole through which the string member is inserted is formed to penetrate the tightening string member attachment portion of the plug, a portion of an end portion of the insertion hole, which is located on a side opposite to the leg portions, serves as a first bar, and a portion connecting the leg portions side of the insertion hole serves as a second bar. A movable shaft whose longitudinal direction is perpendicular to a moving direction thereof is provided on an inner side of the insertion hole so as to be movable between the first bar and the second bar, the string member is clamped and locked when the movable shaft is located at a position close to the first bar and becomes slidable when the movable shaft is located at a position close to the second bar. An end portion of the tightening string member attachment portion of the plug, which is continuous with the leg portions, abuts against the insertion opening of the socket, and the second bar is located on an insertion direction side of the leg portions with respect to a position where the end portion of the plug and the insertion opening of the socket are abutted against each other, in a state where the leg portions are engaged with the socket.

According to other advantageous aspect of the present invention, a recessed portion is formed in a peripheral edge of the insertion opening of the socket, at least a portion of the recessed portion being recessed toward the fixing member attachment portion. The second bar is located on an inner side of the recessed portion in a state where the plug is engaged with the socket.

According to other advantageous aspect of the present invention, a recessed portion is formed in a peripheral edge of the insertion opening of the socket, at least a portion of the recessed portion being recessed toward the fixing member attachment portion. A side edge portion of the second bar, which is located on an inner peripheral surface of the insertion hole, is located from the recessed portion into the accommodating space of the fitting portion in a state where the plug is engaged with the socket.

According to other advantageous aspect of the present invention, the side edge portion is located in the accommodating space of the fitting portion in the state where the plug is engaged with the socket.

DESCRIPTION OF EMBODIMENTS

Figure 1:
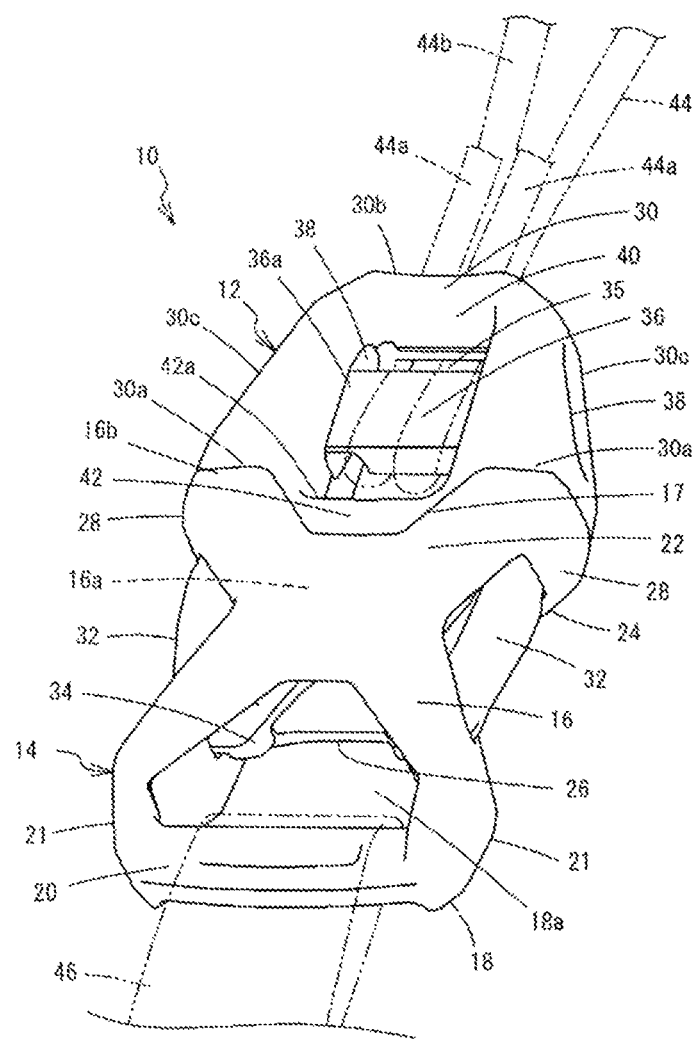
FIG. 1 is a perspective view of a buckle with a string adjustment portion according to a first embodiment of the present invention.

Hereinafter, embodiments of the present invention will be described with reference to the drawings. FIGS. 1 to 3 show a first embodiment of the present invention. A buckle 10 with a string adjustment portion according to the embodiment includes: a plug 12 to which a tightening string member 44 (to be described below) is attached; and a socket 14 where a fixing member 46 (to be described below) is attached and the plug 12 is inserted and engaged. In the following description, a direction in which the plug 12 is inserted and engaged into a fitting portion 16 of the socket 14, is referred to as a front and rear direction. A longitudinal direction of a connecting bar 20 of a fixing member attachment portion 18 (to be described below) which is continuous with the fitting portion 16, is referred to as a left and right direction. A direction orthogonal to the left and right direction and the front and rear direction is referred to as a front and back direction or a thickness direction.

First, the socket 14 will be described. The socket 14 is formed by integral molding with a synthetic resin such as polyacetal, polyamide, or polypropylene. The socket 14 includes: the hollow fitting portion 16 into which a portion of the plug 12 is inserted; and the fixing member attachment portion 18 to which the fixing member 46 such as a belt, a tape, or a string is attached.

The fixing member attachment portion 18 includes: an insertion hole 18a through which the fixing member 46 is inserted; and the connecting bar 20 that connects with the fixing member 46. Two end portions of the connecting bar 20 are connected to a pair of side surface portions 21 which are elongated in the front and rear direction. End portions of the side surface portions 21, which are located on a side opposite to the connecting bar 20, are continuous with the fitting portion 16. The fitting portion 16 is provided such that a front surface portion 22 and a back surface portion 24, which are substantially X-shaped plate bodies, face each other with a predetermined interval therebetween. The front surface portion 22 and the back surface portion 24 have substantially the same shape. A pair of side surface portions 28 is respectively provided on outer sides of end portions, which are located on sides opposite to the side surface portions 21, of the front surface portion 22 and back surface portion 24, so as to connect the front surface portion 22 and the back surface portion 24 such that the front surface portion 22 and the back surface portion 24 face each other with the predetermined interval therebetween. A space surrounded by the front surface portion 22, the back surface portion 24, and the side surface portions 21, 28 is formed into a cylindrical shape that is penetrated in the front and rear direction, and serves as an accommodating space 16a into which the plug 12 is inserted. The accommodating space 16a is opened to the side opposite to the connecting bar 20. An opening thereof serves as an insertion opening 16b into which the plug 12 is inserted.

The front surface portion 22 and the back surface portion 24 are substantially X-shaped plate bodies. A peripheral edge portion of the insertion opening 16b forms a recessed portion 17 which is cut into a trapezoidal shape in the vicinity of a center between the pair of side surface portions 28. The front surface portion 22 and the back surface portion 24 both have the recessed portions 17 having the same shape. Operation spaces are formed between the side surface portions 28 and the side surface portions 21. A corner portion of the back surface portion 24 on the side of the fixing member attachment portion 18 located in the vicinity of a center of the X shape, is cut into a rectangular shape and is provided with an engaged portion 26. Another engaged portion 26 (not shown) is formed on an inner side surface of the front surface portion 22 that faces the engaged portion 26.

A pair of left and right guide protrusions (not shown) is provided on inner side surfaces of the front surface portion 22 and the back surface portion 24 along side edge portions along the operation space. The pair of guide protrusions is located such that a left and right direction width decreases from the insertion opening 16b toward the insertion hole 18a of the fixing member attachment portion 18. That is, two side walls, which face each other, of the pair of guide protrusions serve as guide surfaces that elastically deform a pair of leg portions 32 of the plug 12 to be described below. The pair of leg portions 32, which is inserted into the insertion opening 16b, is elastically deformed to approach each other along the guide protrusions as an amount of insertion thereof increases. Each guide protrusion is formed continuously from the insertion opening 16b to the insertion hole 18a. The engaged portion 26 with which an engaging portion 34 of each leg portion 32 is engaged is formed continuously with the insertion hole 18a.

A pair of left and right guide protrusions is also provided on an inner side surface of the back surface portion 24 along the side edge portions along the operation space, similarly to the front surface portion 22. The pair of guide protrusions is located such that the left and right direction width decreases from the insertion opening 16b toward the insertion hole 18a, and reaches the engaged portion 26.

Next, the plug 12 will be described. The plug 12 is also formed by integral molding with a synthetic resin such as polyacetal, polyamide, or polypropylene. The plug 12 includes: a tightening string member attachment portion 30 configured to attach the tightening string member 44 which has a round cross section and is preferably elastic; and the pair of leg portions 32 which is extended away from the tightening string member attachment portion 30 and inserted into the fitting portion 16 of the socket 14. An extension direction of the leg portion 32 of the plug 12 is the front and rear direction, and axial directions of a movable shaft 36, a first bar 40, and a second bar 42 (to be described below) of the tightening string member attachment portion 30 are the left and right direction.

Figure 2A:
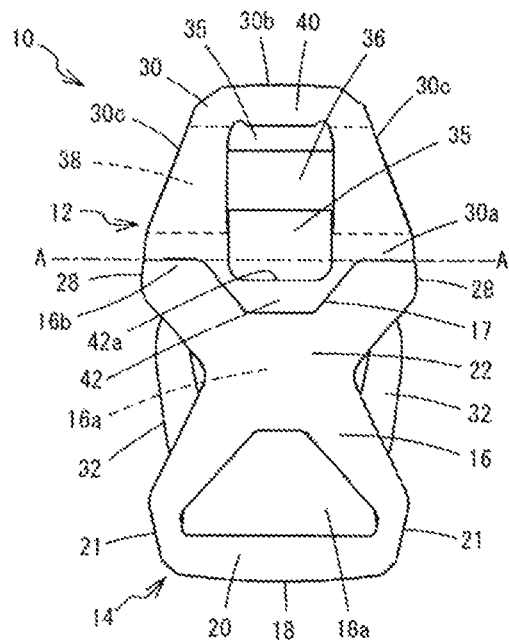
FIG. 2A is a front view of the buckle with the string adjustment portion according to the first embodiment of the present invention.
Figure 2B:
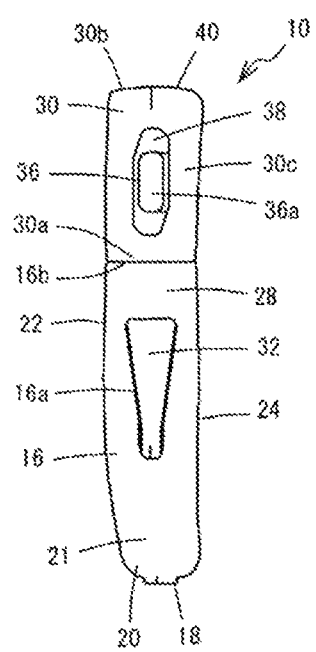
FIG. 2B is a right side view of the buckle with the string adjustment portion according to the first embodiment of the present invention.
Figure 3:
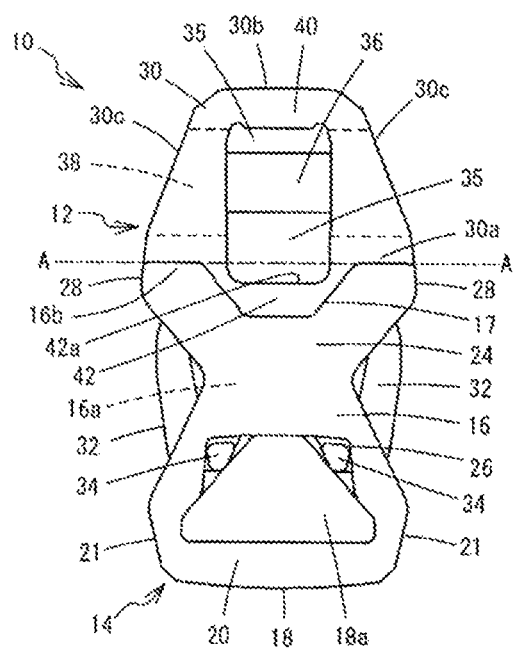
FIG. 3 is a back view of the buckle with the string adjustment portion according to the first embodiment of the present invention.

As shown in FIGS. 2A and 3, the tightening string member attachment portion 30 has a trapezoidal shape whose lower bottom is an end portion 30a that is abutted against an outermost protruding portion of the insertion opening 16b of the socket 14 in a state of being continuous with the leg portion 32 and engaged with the socket 14. An end portion 30b located on a side opposite to the leg portion 32 serves as an upper bottom. An insertion hole 35 through which the tightening string member 44 is inserted, penetrates a center of the tightening string member attachment portion 30 in the thickness direction. The insertion hole 35 has a rectangular shape that is elongated in the front and rear direction. A pair of side edge portions 30c, which connects the end portion 30a and the end portion 30b, is penetrated with shaft holes 38 which pass through the vicinity of a thickness direction center in the left and right direction to communicate with the insertion hole 35. As shown in FIG. 2B, a cross-sectional shape, which intersects an insertion direction, of the shaft hole 38 is an oval shape that is elongated in the front and rear direction. The movable shaft 36 that connects the tightening string member 44 is provided on an inner side of the insertion hole 35. Shaft portions 36a which are inserted into the shaft holes 38 are provided on two longitudinal direction end portions of the movable shaft 36 so as to protrude along the longitudinal direction. Since each shaft portion 36a is inserted inside the shaft hole 38 with a clearance and can slide in the shaft hole 38 in the front and rear direction, the movable shaft 36 is movable in the front and rear direction.

One front and rear direction end portion of the insertion hole 35 reaches the vicinity of the end portion 30b. The first bar 40 extends along the left and right direction between the insertion hole 35 and the end portion 30b. The other end portion of the insertion hole 35 reaches the vicinity of the pair of leg portions 32 beyond the end portion 30a. The second bar 42 extends along the left and right direction between the other end portion and the pair of leg portions 32. The second bar 42 has a trapezoidal shape that fits into the recessed portion 17 of the insertion opening 16b of the socket 14 and is bent so as to protrude in the front and rear direction. A part of the second bar 42 is located inside the insertion opening 16b such that the insertion opening 16b can be closed.

The pair of leg portions 32 has symmetrical shapes and equal lengths, and extends in parallel with each other from two left and right direction ends of the tightening string member attachment portion 30 in the front and rear direction to a side opposite to the first bar 40. The engaging portions 34 that engage with the engaged portions 26 of the fitting portion 16 are integrally formed at positions close to tip end portions of the leg portions 32. The engaging portions 34 protrude on two thickness direction side of the leg portions 32.

Concerning a thickness of each portion of the plug 12, the leg portions 32 are thinner than the tightening string member attachment portion 30. The tightening string member attachment portion 30 has almost the same thickness as the fitting portion 16 of the socket 14, and the leg portion 32 is made thinner than the tightening string member attachment portion 30 so as to be capable of being inserted into the accommodating space 16a of the fitting portion 16. The leg portions 32 become thinner toward tip ends of the leg portions 32. The end portion 30a of the tightening string member attachment portion 30 forms a step between the tightening string member attachment portion 30 and the leg portions 32. The engaging portions 34 are thickened so as to protrude from the leg portions 32 toward two thickness direction sides, and protruding surfaces thereof are flat. The second bar 42 is slightly thinner than the tightening string member attachment portion 30, and a portion thereof is inserted into the accommodating space 16a of the fitting portion 16.

Next, an engagement operation and an attachment method of the buckle 10 with the string adjustment portion of the first embodiment will be described below. The buckle 10 with the string adjustment portion is attached to the vicinity of an opening portion of a bag or the like (not shown). One tightening string member 44 is inserted in the opening portion along the peripheral edge portion, and two end portions 44a of the tightening string member 44 are drawn out from string holes or the like. The opening portion is opened and closed by changing lengths of the two end portions 44a of the tightening string member 44 pulled out from the string holes or the like.

As shown in FIG. 1, according to the method of attaching the buckle 10 with the string adjustment portion, the fixing member 46 is wound around the connecting bar 20 of the socket 14, and end portions of the fixing member 46 are fixed in the vicinity of the string holes or the like of the opening portion of the bag or the like. Further, the two end portions 44a of the tightening string member 44 pulled out from the string holes or the like are aligned, made into two strands, inserted from the insertion hole 35 of the plug 12 between the second bar 42 and the movable shaft 36, wound around the movable shaft 36, inserted between the movable shaft 36 and the first bar 40, and pulled out to the outside.

The tightening string member 44 and the fixing member 46 may be attached in a state where the plug 12 and the socket 14 are engaged, or the plug 12 and the socket 14 may be engaged after the tightening string member 44 or the fixing member 46 is attached. According to the engagement operation of the plug 12 and the socket 14, the plug 12 is pushed into the socket 14 with the leg portions 32 of the plug 12 facing the insertion opening 16b of the socket 14. When the leg portions 32 are inserted into the accommodating space 16a, the leg portions 32 are clamped by the guide protrusions (not shown), and a gap between the guide protrusions becomes narrower as the plug 12 is inserted, so that the leg portions 32 are elastically deformed to approach each other. When the engaging portions 34 of the leg portions 32 reach the engaged portions 26 of the front surface portion 22 and the back surface portion 24, the elastic deformation is restored, the engaging portions 34 are fitted to the engaged portions 26 and cannot be pulled out, so that the plug 12 and the socket 14 are reliably engaged with each other. As shown in FIGS. 2A and 3, the end portion 30a of the tightening string member attachment portion 30 of the plug 12 and two outermost protruding side portions of the insertion opening 16b of the fitting portion 16 of the socket 14, are abutted against each other on line A-A. At this time, a side edge portion 42a, which is located on an inner peripheral surface of the insertion hole 35, of the second bar 42 of the plug 12 is closer to a center of the fitting portion 16 of the socket 14 than line A-A, that is, at a position close to the fixing member attachment portion 18. The second bar 42 is located inside the recessed portion 17 of the insertion opening 16b of the socket 14, and the insertion opening 16b is thus closed. The movable shaft 36 is movable to a position where the movable shaft 36 is abutted against the side edge portion 42a of the second bar 42. A portion of each leg portion 32 of the plug 12 protrudes into the operation space between the side surface portions 28 and the side surface portions 21 of the socket 14.

As a result, the plug 12 and the socket 14 are brought into an engaged state, and the attachment of the buckle 10 with the string adjustment portion to the opening portion is completed. A ring portion 44b of the tightening string member 44 along the opening portion extends from a gap between the second bar 42 and the movable shaft 36 in the insertion hole 35 of the plug 12. The two end portions 44a of the tightening string member 44 extend from a gap between the first bar 40 and the movable shaft 36. The ring portion 44*b* and the two end portions 44*a* extend in the same direction. The tightening string member 44 and the fixing member 46 are connected to each other in a longitudinal direction thereof via the buckle 10 with the string adjustment portion.

Next, a method of using the buckle 10 with the string adjustment portion will be described. When no tension is applied to the tightening string member 44, that is, when the opening portion of the bag or the like is opened, the movable shaft 36 freely moves within a range of a length of the shaft hole 38. The tightening string member 44 can freely slide and change a length of the ring portion 44*b* of the tightening string member 44. When the opening portion is narrowed and closed, the buckle 10 with the string adjustment portion is held by one hand, and the other hand pulls the two end portions 44*a* of the tightening string member 44, which extend from the insertion hole 35, in a direction away from the insertion hole 35. As a result, the ring portion 44*b* is shortened, and the opening portion can be narrowed. When the opening portion is narrowed, tension is applied to the two end portions 44*a* and the ring portion 44*b* in a direction away from the movable shaft 36, and the movable shaft 36 is urged and moved toward the first bar 40. The two end portions 44*a* of the tightening string member 44 are sandwiched and locked between the first bar 40 and the movable shaft 36, the two end portions 44*a* are not pulled back, the ring portion 44*b* is not unintentionally loosened, and thus the opening portion can be narrowed.

When the opening portion is widened and opened, the buckle 10 with the string adjustment portion is pulled up at an angle close to a right angle such that the end portion thereof on the side of the first bar 40 is separated from the ring portion 44*b*, tension of the two end portions 44*a* and the ring portion 44*b* is separated at the angle close to the right angle, the movable shaft 36 is separated from the first bar 40, and locking of the two end portions 44*a* is released. As a result, the tightening string member 44 becomes freely slidable, the ring portion 44*b* can be pulled out and extended, and thus the opening portion can be widened and opened. Thus articles can be taken out from and put into the bag. When an impact force is applied to the buckle 10 with the string adjustment portion and a strong force is applied in a direction of separating the plug 12 and the socket 14 in a state where the plug 12 and the socket 14 are engaged with each other, the leg portions 32 of the plug 12 are elastically deformed to release the engagement and prevent damage.

The buckle 10 with the string adjustment portion of the first embodiment has a small size, a simple appearance and good operability, and can reliably hold the tightening string member 44. When the present invention is used in the opening portion of the bag or the like, opening and closing can be easily performed when the articles are taken out and put in, and the opening portion can be reliably closed during conveyance or storage. The second bar 42 of the plug 12 is located closer to the center of the fitting portion 16 of the socket 14 than line A-A, which is the insertion opening 16*b* of the socket 14, that is, at the position close to the fixing member attachment portion 18, so that the end portion 30*b* of the plug 12 can be brought close to line A-A to reduce the size of the buckle 10 with the string adjustment portion. Since the second bar 42 is located closer to the center of the fitting portion 16 of the socket 14 than line A-A, that is, at the position close to the fixing member attachment portion 18, the insertion hole 35 can be enlarged in the front and rear direction, and operability is improved at the time of inserting the tightening string member 44. Moreover, the second bar 42 is surrounded by the recessed portion 17 of the socket 14 and is thus reinforced, so that the second bar 42 has no risk of being caught by other members, thus damage can be prevented and durability is ensured. Further, since the buckle 10 with the string adjustment portion is downsized and hardly broken, the present invention can be used in cases where a radius of a curved surface of an outer shape is small, such as a purpose of stopping ski stocks.

Figure 4:
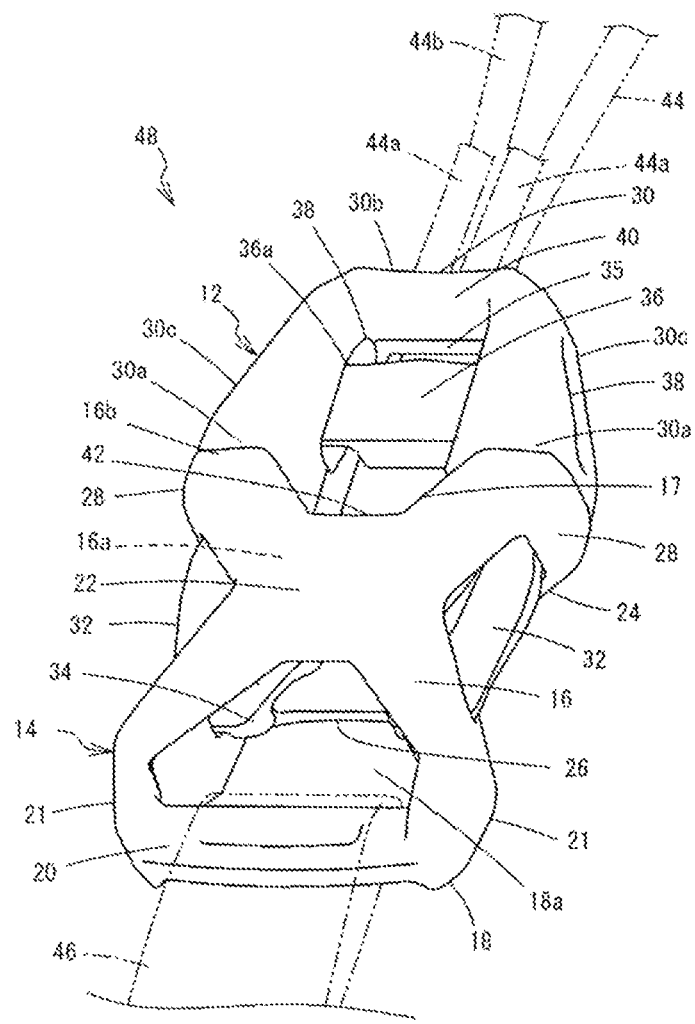
FIG. 4 is a perspective view of a buckle with a string adjustment portion according to a second embodiment of the present invention.
Figure 5A:
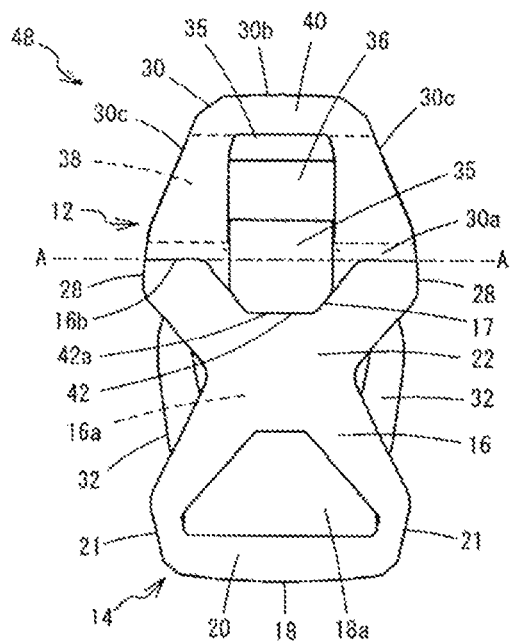
FIG. 5A is a front view of the buckle with the string adjustment portion according to the second embodiment of the present invention.
Figure 5B:
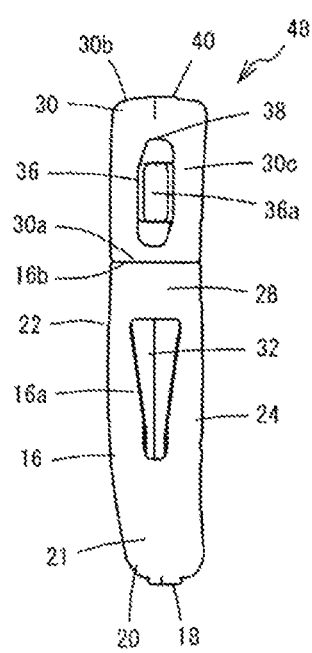
FIG. 5B is a right side view of the buckle with the string adjustment portion according to the second embodiment of the present invention.
Figure 6:
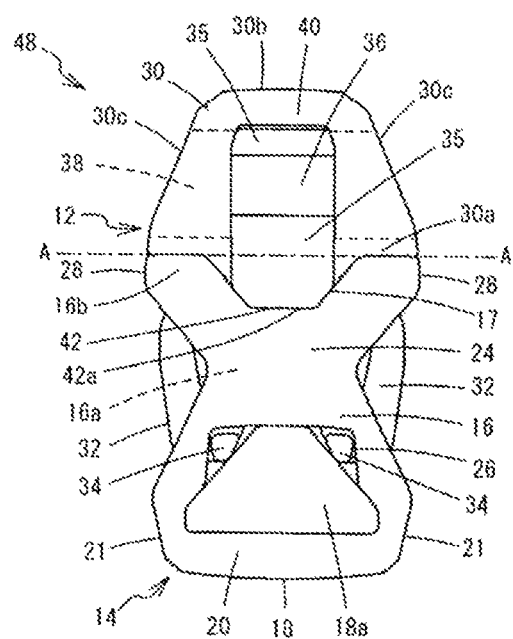
FIG. 6 is a back view of the buckle with the string adjustment portion according to the second embodiment of the present invention.

Next, a second embodiment of the present invention will be described with reference to FIGS. 4 to 6. The same members as those in the first embodiment are denoted by the same reference signs, and descriptions thereof will be omitted. As shown in FIGS. 5A and 6, the tightening string member attachment portion 30 of a buckle 48 with a string adjustment portion of the second embodiment has a trapezoidal shape whose lower bottom is the end portion 30*a* that is abutted against a most protruding portion of the insertion opening 16*b* of the socket 14 when the end portion 30*a* is continuous with the leg portion 32 and engaged with the socket 14. The end portion 30*b* located on the side opposite to the leg portion 32 serves as an upper bottom. The insertion hole 35 through which the tightening string member 44 is inserted penetrates the center of the tightening string member attachment portion 30 in the thickness direction, and the insertion hole 35 has a rectangular shape that is elongated in the front and rear direction.

One front and rear direction end portion of the insertion hole 35 reaches the vicinity of the end portion 30*b*. The first bar 40 extends along the left and right direction between the insertion hole 35 and the end portion 30*b*. The other end portion of the insertion hole 35 greatly extends beyond the end portion 30*a* and reaches the vicinity of the pair of leg portions 32. The second bar 42 extends along the left and right direction between the other end portion and the pair of leg portions 32.

When the plug 12 and the socket 14 are engaged, as shown in FIGS. 5A and 6, the end portion 30*a* of the tightening string member attachment portion 30 of the plug 12 and two most protruding side portions of the insertion opening 16*b* of the fitting portion 16 of the socket 14, are abutted against each other on line A-A. At this time, the side edge portion 42*a*, which is located on the inner peripheral surface of the insertion hole 35, of the second bar 42 of the plug 12 is closer to the center of the fitting portion 16 of the socket 14 than line A-A, that is, at the position close to the fixing member attachment portion 18. The side edge portion 42*a* coincides with a deep position of the recessed portion 17 of the insertion opening 16*b* of the socket 14, closes the insertion opening 16*b*, and is located substantially in the insertion opening 16*b* of the fitting portion 16. Alternatively, the side edge portion 42*a* may enter the accommodating space 16*a* beyond the deep position of the recessed portion 17. The movable shaft 36 is movable to a position where the movable shaft 36 is abutted against a side edge portion of the recessed portion 17.

According to the buckle 48 with the string adjustment portion of the second embodiment, the same effects as that of the first embodiment are obtained. Since the second bar 42 coincides with the deep position of the recessed portion 17 or reaches the inside of the accommodating space 16*a* beyond the recessed portion 17, the end portion 30*b* can be made closer to line A-A than in the first embodiment, and the buckle 48 with the string adjustment portion can be shortened and compact. The insertion hole 35 can be made larger in the front and rear direction, so that the operability is improved. Moreover, since the entire second bar 42 is completely covered by the socket 14, the second bar 42 is reinforced, so that the second bar 42 has no risk of being caught by other members, and thus there is no risk of damage.

The buckle with the string adjustment portion of the present invention is not limited to the above-described embodiments, and shapes of the members can be freely changed. Shapes of the leg portions and the engaging portions of the plug can be freely changed, and may be any shape as long as the engagement can be reliably performed and attachment and detachment can be easily performed. An article to which the buckle with the string adjustment portion is attached may be any article, such as a bag, clothes or a cold protection tool.

What is claimed is:

1. A buckle with a string adjustment portion, the buckle comprising:
    a plug and a socket which are capable of being connected to and disconnected from each other and which are configured to be respectively attached to a predetermined string member and a fixing member,
    wherein the plug includes: a tightening string member attachment portion configured to slidably lock the string member and adjust a length of the string member; and leg portions which are inserted into and engaged with the socket,
    wherein the socket includes: a fixing member attachment portion to which the fixing member is attached; and a fitting portion configured to accommodate and engage with the leg portions of the plug, the fitting portion including an insertion opening which is located on a side opposite to the fixing member attachment portion and into which the leg portions are inserted,
    wherein the insertion opening opens to an accommodating space in which the leg portions are accommodated,
    wherein an insertion hole through which the string member is inserted is formed to penetrate the tightening string member attachment portion of the plug, a portion of an end portion of the insertion hole, which is located on a side opposite to the leg portions, serves as a first bar, and a portion connecting end portions of the tightening string member attachment portion at the leg portions side of the insertion hole serves as a second bar,
    wherein a movable shaft whose longitudinal direction is perpendicular to a moving direction thereof is provided on an inner side of the insertion hole so as to be movable between the first bar and the second bar, the string member is clamped and locked when the movable shaft is located at a position close to the first bar and becomes slidable when the movable shaft is located at a position close to the second bar,
    wherein the end portions of the tightening string member attachment portion of the plug, which are continuous with the leg portions, abut against the insertion opening of the socket, and the second bar is located on a side of the leg portions proximate to where the end portions of the tightening string member attachment portion and the insertion opening of the socket are abutted against each other, in a state where the leg portions are engaged with the socket,
    wherein a recessed portion is formed in a peripheral edge of the insertion opening of the socket, at least a portion of the recessed portion being recessed toward the fixing member attachment portion, and
    wherein a side edge portion of the second bar, which is located on an inner peripheral surface of the insertion hole, is located in the accommodating space of the fitting portion and is aligned with or offset from a deep position of the recessed portion in a state where the plug is engaged with the socket.

2. The buckle according to claim 1,
    wherein the side edge portion is offset from the deep position of the recessed portion of the accommodating space of the fitting portion towards the fixing member attachment portion in the state where the plug is engaged with the socket.

\* \* \* \* \*